United States Patent [19]

Sullivan et al.

[11] Patent Number: 4,536,862

[45] Date of Patent: Aug. 20, 1985

[54] SEISMIC CABLE ASSEMBLY HAVING IMPROVED TRANSDUCERS

[75] Inventors: Lawrence B. Sullivan, Plano; Charng-Wen M. Lo, Richardson, both of Tex.

[73] Assignee: Texas Instruments Incorporated, Dallas, Tex.

[21] Appl. No.: 381,102

[22] Filed: May 24, 1982

[51] Int. Cl.³ .................. G01V 1/38; H04R 17/00
[52] U.S. Cl. ........................... 367/153; 367/155; 367/160; 367/163; 367/173; 310/331; 310/337
[58] Field of Search ............. 367/157, 160, 161, 163, 367/167, 172, 154, 162, 168, 180, 153, 155, 173; 310/331, 332, 337

[56] References Cited

U.S. PATENT DOCUMENTS

| | | | |
|---|---|---|---|
| 2,762,032 | 9/1956 | Vogel | 367/154 |
| 3,749,948 | 7/1973 | Morris | 310/331 |
| 3,947,644 | 3/1976 | Uchikawa | 310/332 |
| 3,970,878 | 7/1976 | Berglund | 310/337 |
| 4,370,583 | 1/1983 | Ljung | 310/331 |

Primary Examiner—Sal Cangialosi
Assistant Examiner—K. Kaiser

Attorney, Agent, or Firm—Thomas G. Devine; Leo N. Heiting; Melvin Sharp

[57] ABSTRACT

A seismic cable assembly having an acoustically transparent tubular enclosure has at least one hydrophone electrically connected and positioned within the cable assembly enclosure. The hydrophone is made up of a pair of formed, electrically conductive plates that fit against an insulating seal which also forms a fluid seal, providing a sealed chamber defined by the inside surfaces of the conductive plates. A pair of piezoelectric elements are interconnected and positioned within the sealed chamber, one element mechanically and electrically connected to the inside surface of one of the conductive plates and the other piezoelectric element mechanically and electrically connected to the inside surface of the other conductive plate. When pressure is applied to the conductive plates, they deform, causing the piezoelectric elements to flex. When the elements flex, an electrical output is presented on the conductive plates which serve as terminals. Depending upon the polarity relationship of the elements, the output is that of an acceleration-cancelling hydrophone, or that of an accelerometer.

20 Claims, 11 Drawing Figures

DIRECTION OF ACCELERATION ↓

SEISMIC CABLE ASSEMBLY HAVING IMPROVED TRANSDUCERS

BACKGROUND OF THE INVENTION

1. Field of the Invention

This invention pertains to seismic exploration systems and in particular to seismic cable assemblies having high sensitivity acceleration-cancelling hydrophones, and accelerometers.

2. Description of the Prior Art

In underwater acoustic activities such as marine geophysical exploration, depth detection and anti-submarine warfare, hydrophones are used to detect water-born acoustic waves and convert the pressure signal to a corresponding electrical signal. In recent times, these hydrophones employ piezoelectric elements to convert mechanical strain to electrical voltages.

Arrays of hydrophones have been used in undersea acoustic work to add to the effectiveness of individual sensors by increasing acoustic sensitivity, decreasing unwanted noise and adding directionality. Many methods have been developed to deploy and utilize these arrays, including stationary transducer installation attached to the sea bed, stationary sensor arrays suspended from anchored ships, and in-line hydrophone groupings towed behind a moving vessel. Commercial geophysical companies have used this last method extensively in petroleum exploration activities conducted worldwide. In the past, to reduce noise in towed arrays, acceleration-cancelling hydrophones have been used. These hydrophones are designed so that the electrical outputs of the flexible piezoelectric elements are organized to maximize the response to acoustic waves while minimizing the response to acceleration normal to the active assemblies. In arrays of hydrophones of this type, the shaking of the hydrophone due to mechanically-born vibrations transmitted from the ship as well as acceleration of the array structure caused by turbulence and vortex shedding does not result in spurious electrical signals superimposed on the desirable acoustic data. However, because of a requirement of high acoustic sensitivity dictating that the flexing piezoelectric assemblies be very elastic, they consequently deform greatly under high external pressure, whereby depth capability and inherent sturdiness are somewhat less than desired.

In accordance with this invention, a hydrophone for acoustic detection is provided that is adaptable for shallow and deep water. By a reversal of polarity of one piezoelectric element, an accelerometer is provided.

BRIEF SUMMARY OF THE INVENTION

A hydrophone for acoustic wave detection is made up of a pair of formed electrically conductive plates with a piezoelectric element secured to the inside of each plate in a manner so that electrical contact is maintained between each plate and the electrode of the piezoelectric element secured to it, causing each conductive plate to be at the same electrical potential as the face of the piezoelectric element attached to it.

The piezoelectric elements are suitably arranged and interconnected within the hydrophone so that they are connected in electrical series in this preferred embodiment. They may also be connected in parallel. The formed conductive plates are attached to an electrically-insulating layer in such a manner that the mechanical joints between the conductive plates and the insulation layer are completely sealed against fluid leakages. The inside surfaces of the conductive plates forms a sealed chamber. The sealed chamber is typically filled with air at atmospheric pressure, but it also may be filled with other types of nonconductive fluids, or gases at a variety of pressures, depending upon the particular application. With the piezoelectric elements properly electrically aligned, an accelerometer is provided. Instead of measuring pressure, acceleration is measured.

This structure provides a hydrophone whose piezoelectric elements are totally enclosed and sealed against fluid leakage by one simple seal. This simplicity of construction ensures a rugged and dependable unit.

A principal object of this invention is to provide a seismic cable having high sensitivity acceleration-cancelling hydrophones.

Another object of this invention is to provide a seismic cable having hydrophones that provide high acoustic output and are mechanically sturdy.

Still another object is to provide a seismic cable having hydrophones wherein the housing is made up of a pair of formed electrical conductive plates insulated from each other to provide electrical terminals for the hydrophone.

Still another object of this invention is to provide a seismic cable having hydrophones with piezoelectric elements that are totally enclosed and sealed against fluid leakage.

A further object of this invention is to provide a hydrophone for acoustic wave detection that has a high sensitivity and is acceleration-cancelling.

Another object of this invention is to provide an accelereometer wherein the housing is made up of a pair of formed electrical conductive plates, electrically insulated from each other to provide electrical terminals for the accelerometer, and the piezoelectric elements are positioned on the inside surface of the conductive plates.

These and other objects will be made evident in the detailed description that follows.

DETAILED DESCRIPTION OF THE INVENTION

Figure 1:
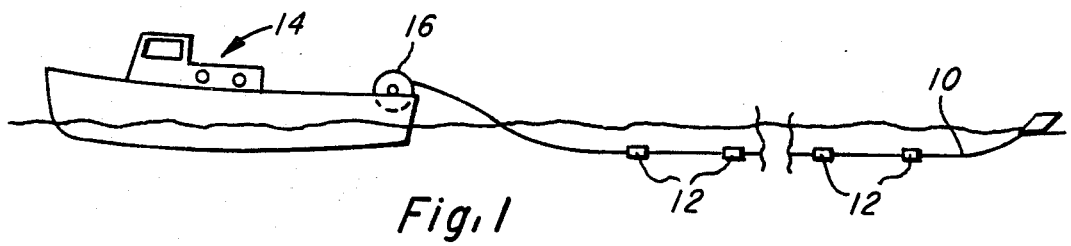
FIG. 1 depicts a typical seismic exploration system.

FIG. 1 illustrates a boat 14 with a winch 16 upon which is wound seismic cable 10 having sections 12. The semismic cable 10 generally contains a plurality of electrical conductors and/or light conducting fibers. Hydrophones are enclosed in the cable 10 in a protective acoustically-transparent flexible tube that is filled with a special medium which provides acoustic coupling between the tubing and the hydrophone and which provides buoyancy to the array.

Figure 2:
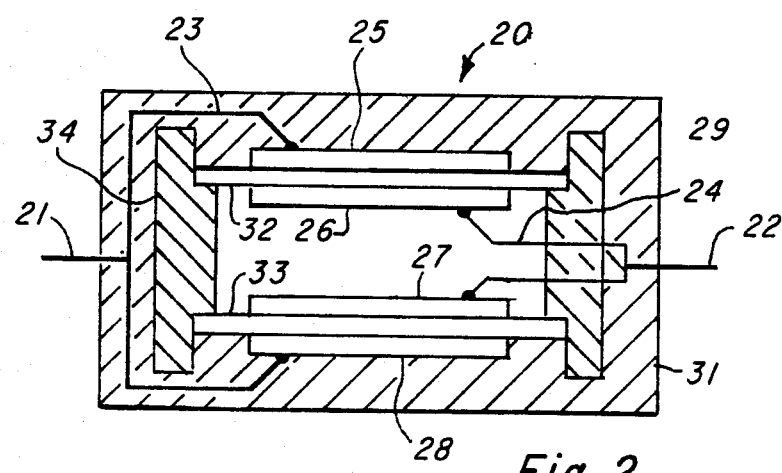
FIG. 2 is a cross section of a prior art, four element hydrophone.

FIG. 2 illustrates a prior art hydrophone 20 having piezoelectric elements 25 and 26 mounted on opposite sides of flexible plate 32 and piezoelectric elements 27 and 28 mounted on opposite sides of flexible plate 33. Terminal 21 is connected through conductor 23 to elements 25 and 28. Elements 26 and 27 are connected through conductors 24 to terminal 22. Rigid end plates 29 hold the ends of flexible plates 32 and 33, the entire assembly being positioned within waterproof, elastic housing 31. This type of hydrophone is known as a "bender" hydrophone. Force applied to the housing 31 is transmitted to the piezoelectric elements 25–28 which move in conformance with the pressure applied.

Figure 3:
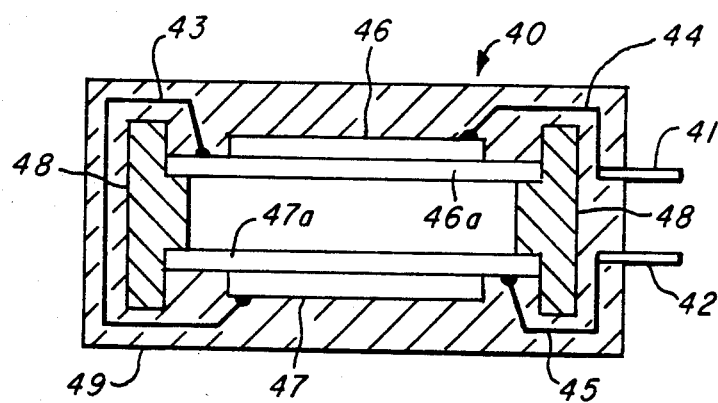
FIG. 3 is a cross section of a two element prior art hydrophone.

FIG. 3 is a two element prior art hydrophone 40 having rigid end pieces 48 which support flexible plates 46a and 47a. Piezoelectric element 46 is mounted on flexible plate 46a and piezoelectric element 47 is mounted on flexible plate 47a. Element 47 is connected to element 46 by way of conductor 43. Element 46 is brought out to terminal 41 through conductor 44 and element 47 is brought out to terminal 42 through conductor 45.

In both of these prior art structures, it is required that the piezoelectric elements be very elastic. Consequently, these units deform greatly under high external pressure. Thus, it can be seen that in these prior art designs, depth capability and inherent sturdiness have been compromised for high acoustic sensitivity.

Figure 4A:
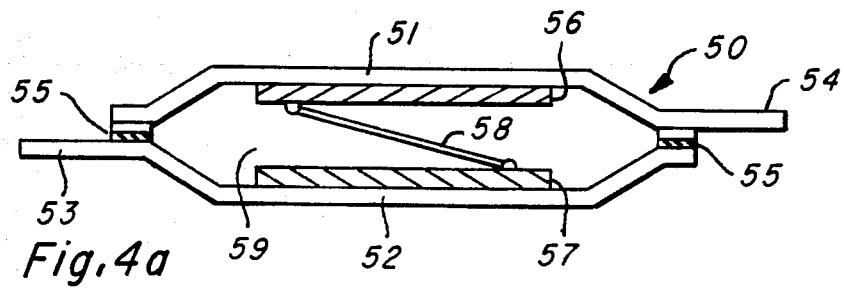
FIG. 4a is a cross section of the hydrophone of this invention.

The hydrophone 50 of this invention is illustrated in FIG. 4a. The cross sectional view shown in 4a illustrates a pair of formed electrically conductive plates 51 and 52 attached to an electrically-insulating layer 55 in such a manner that the mechanical joints between conductive plates 51 and 52 and insulation layer 55 are completely sealed against fluid leakages forming a sealed chamber 59. Piezoelectric element 56 is mechanically and electrically connected to the inside face of plate 51 and piezoelectric element 57 is mechanically and electrically connected to the inside of plate 52. Conductor 58 which in this preferred embodiment is a ribbon-shaped conductor, interconnects elements 56 and 57 in a serial fashion. Plate 51 extends into terminal 54 and plate 52 extends into terminal 53.

Figure 4B:
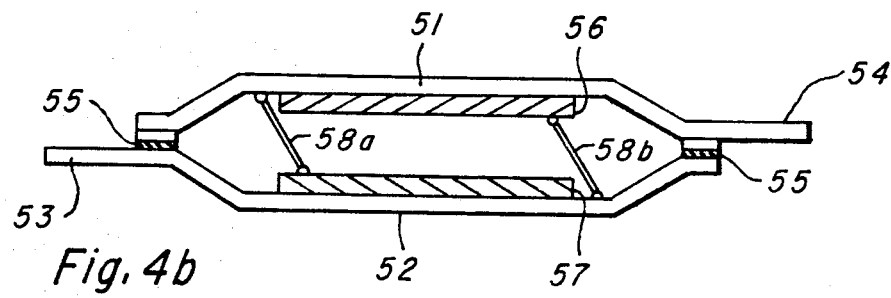
FIG. 4b is a cross section of another embodiment.

FIG. 4b shows a structure identical to that of FIG. 4a except that piezoelectric elements 56 and 57 are connected in parallel through conductors 58a and 58b.

Figure 5:
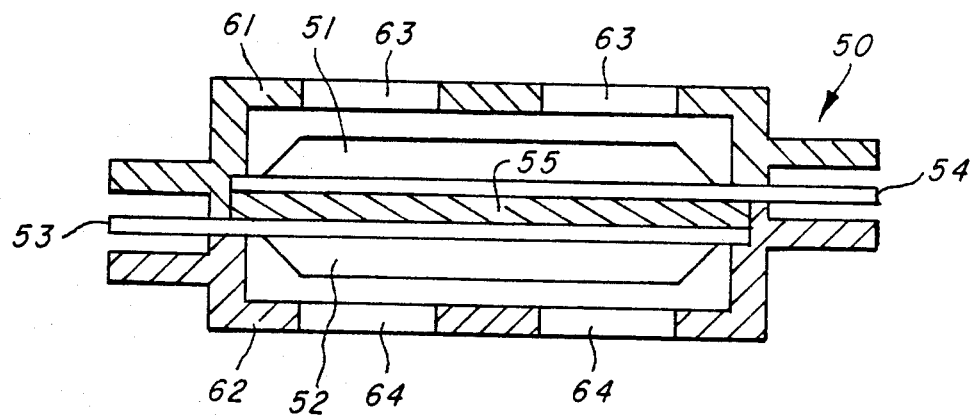
FIG. 5 illustrates the hydrophone of this invention positioned within a holder.

FIG. 5 illustrates the hydrophone 50 of this invention within a holder to form assembly 60. The holder is made up of a top section 61 and a bottom section 62 having openings 63 in the top section and openings 64 in the bottom section 62. The holder made up of sections 61 and 62 forms a protective structure that may be inserted into the seismic cable 10 and which protects the hydrophone 50 from mechanical abuse.

MODE OF OPERATION OF THE INVENTION

Figure 6A:
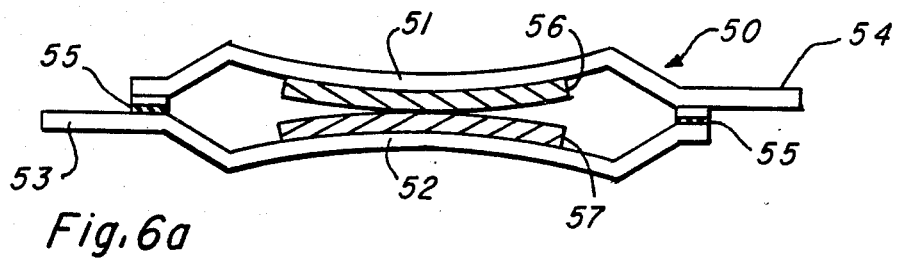
FIGS. 6a–6d illustrate the hydrophone of this invention with various forces applied.

Turning now to FIG. 6a, the hydrophone 50 is shown when excessive external pressure is applied at depths beyond the capability of the hydrophone 50. Conductive plates 51 and 52 are both forced inwardly causing piezoelectric elements 56 and 57 to press together. This collapse is designed to occur at inward deflections insufficient to damage elements 56 and 57 at stress levels below the yield strength of the conductive plates 51 and 52. As the hydrophone 50 is removed from the overpressure condition, the normal configuration is assumed and normal operation occurs. The structure therefore is protected against damage due to excessive external pressure.

Figure 6B:
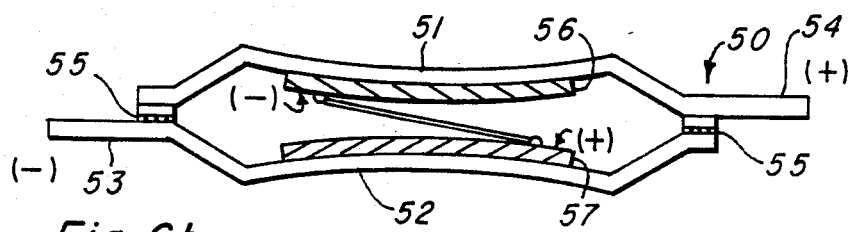

FIG. 6b shows the mechanical action of the hydrophone 50 in response to external acoustic stimuli and also a correlation of transformation of such acoustic stimuli into electrical signals. Plates 51 and 52 are shown being pushed inwardly by the condensation portion of an enveloping acoustic wave. As the external pressure rises, both plates 51 and 52 deflect inwardly slightly from their equilibrium position against a reasonably stable internal pressure (atmospheric in this preferred embodiment). Due to this distortion, electrical fields are established and the piezoelectric elements 56 and 57 with polarities on the opposite faces of elements 56 and 57 as shown provide a positive voltage of terminal 54 and a negative voltage on terminal 53.

Figure 6C:
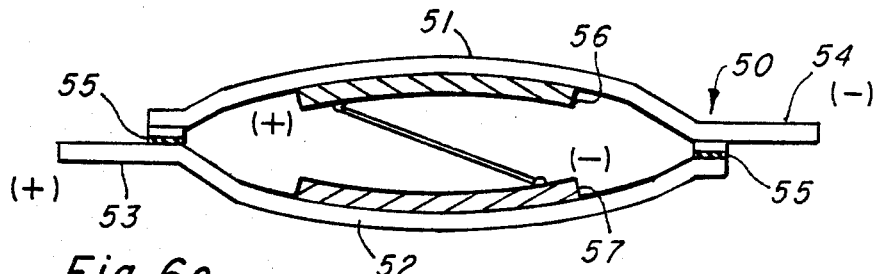

FIG. 6c shows the hydrophone action caused by the rarefaction portion of the enveloping acoustic wave. It can be seen that the hydrophone 50 output on terminals 53 and 54 is caused by outward deflection of the plates 51 and 52 and that the electrical voltages so produced are the reversal of the situation of FIG. 6b.

Figure 6D:
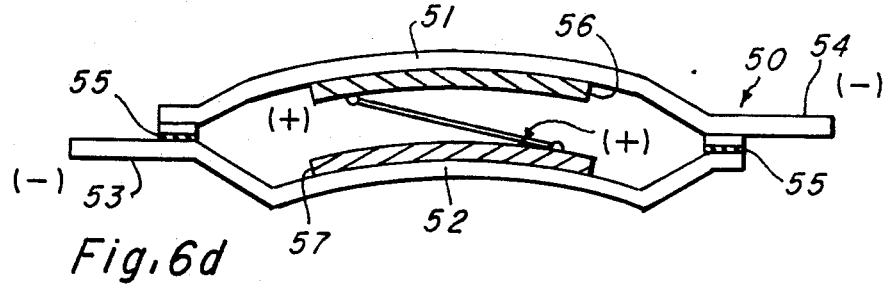

The action of the hydrophone 50 to acceleration normal to the conductive plates 51 and 52 is shown in FIG. 6d. FIG. 6d illustrates the acceleration-cancelling feature. When the hydrophone 50 is accelerated in the direction shown, conductive plates 51 and 52 will distort as indicated and set up polarities on terminals 53 and 54 as shown. Since the electrical output from each of plates 51 and 52 resulting from the piezoelectric elements 56 and 57, respectively, of virtually identical amplitude but opposite in polarity, and since the sum of these voltage levels represents the output of the hydrophone, then the output of the hydrophone to accelerations normal to the plates 51 and 52 will be virtually zero.

Accelerations applied parallel to the plates 51 and 52, on the other hand, will generate only negligible stresses in the direction of polarity of the piezoelectric elements 56 and 57 and thus will produce a negligible response from hydrophone 50.

Figure 7:
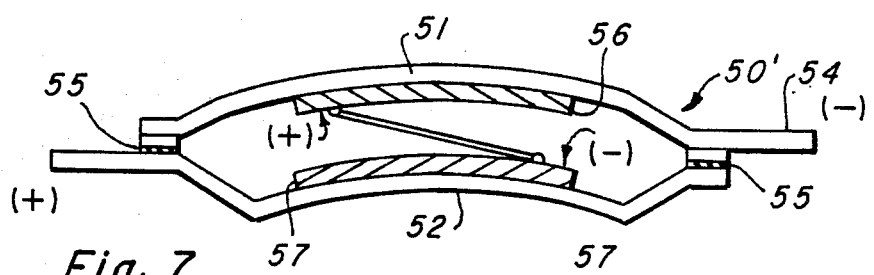
FIG. 7 illustrates the accelerometer of this invention.

FIG. 7 illustrates an accelerometer 50'. Piezoelectric element 57 is reversed from the structure shown in FIG. 6d. With this configuration, a negative voltage is developed on plate 51 and a positive voltage is developed on plate 52 when the accelerometer is accelerated in the direction shown. A voltage across terminals 53 and 54 then is indicative of acceleration.

It is contemplated that those skilled in the art may change the general configuration of this hydrophone and the seismic cable without departing from the scope of the invention as defined in the appended claims. For example, it is contemplated that more than two conductive plates and one seal therebetween may be employed. Also, more than two piezoelectric elements may be connected in the circuit. A filing of elastic foam in the sealed chamber as well as a bimorph piezoelectric element is also contemplated.

What is claimed is:
1. A seismic exploration system comprising:
   (a) a seismic cable assembly having an acoustically transparent tubular enclosure;
   (b) at least one pressure transducer electrically connected and positioned within the cable assembly enclosure including:
      (1) an elastic, deformable, electrically-conductive housing arranged in at least two sections, the sections servicing as terminals for an electrical output to the cable assembly;

(2) insulating means positioned between the housing sections to electrically insulate the sections from each other and to form a fluid seal to provide a sealed chamber defined by the inside surfaces of the housing sections, the sealed chamber being filled with a non-pressurized, non-conductive gas; and (3) at least two pressure-to-electrical devices electrically interconnected within the sealed chamber, mechanically and electrically connected to the inside surfaces of the two housing sections, respectively, within the sealed chamber so that the devices flex when pressure is applied to the enclosure causing the housing sections to deform providing an electrical output through the housing sections.

2. The system of claim 1 wherein the pressure-to-electrical devices are connected in series.

3. The system of claim 1 wherein the pressure to electrical devices are connected in parallel.

4. The system of claim 2 wherein the pressure-to-electrical devices are oriented to provide opposite polarity when fixed in opposite directions so that the output is indicative of pressure.

5. The system of claim 2 wherein the pressure-to-electrical devices are oriented to provide the same polarity when flexed in opposite directions so that the output is indicative of acceleration.

6. The system of claim 1 wherein the conductive housing comprises metal.

7. The system of claim 1 wherein the pressure-to-electrical devices comprise piezoelectric elements.

8. The system of claim 7 wherein the housing sections comprise a pair of formed electrical conductive plates.

9. The system of claim 8 wherein the system further comprises a holder assembly adapted to fit within the seismic cable enclosure and to surround the pressure transducer.

10. The system of claims 8 or 9 wherein the distance between the inside surfaces is selected to permit the elements to press together before the yield strength of the conductive plates is exceeded, whereby protection against excessive pressure is provided.

11. An acoustic wave detecting pressure transducer comprising:

(an elastic, deformable, electrically conductive housing arranged in at least two sections, the sections serving as terminals for an electrical output;

(b) insulating means positioned between the housing sections to electrically insulate the sections from each other and to form a fluid seal to provide a sealed chamber defined by the inside surfaces of the housing sections, the sealed chamber being filled with a non-pressurized, non-conductive gas; and (c) at leat two pressure-to-electrical devices electrically interconnected with the sealed chamber, mechanically and electrically connected to the inside surfaces of the two housing sections, respectively, within the sealed chamber, so that the devices flex when pressure is applied and the housing sections are thereby deformed providing an electrical output through the housing sections.

12. The transducer of claim 11 wherein the pressure-to-electrical devices are connected in series.

13. The transducer of claim 11 wherein the pressure-to-electrical devices are connected in parallel.

14. The transducer of claim 11 wherein the pressure-to-electrical devices are oriented to provide opposite polarity when flexed in opposite directions so that the output is indicative of pressure.

15. The transducer of claim 11 wherein the pressure-to-electrical devices are oriented to provide the same polarity when flexed in opposite directions so that the output is indicative of acceleration.

16. The transducer of claim 11 wherein the conductive housing comprises metal.

17. The transducer of claim 12 wherein the pressure-to-electrical devices comprise piezoelectric elements.

18. The transducer of claim 13 wherein the pressure-to-electrical devices comprise piezoelectric elements.

19. The transducer of claim 18 further including a holder assembly adapted to surround the transducer.

20. The transducer of claim 18 or 19 wherein the distance between the inside surfaces is selected to permit the elements to press together before the yield strength of the conductive plates is exceeded, whereby protection against excessive pressure is provided.

* * * * *